United States Patent [19]
Augustyniak et al.

[11] Patent Number: 5,517,093
[45] Date of Patent: May 14, 1996

[54] BRAKING GRID ISOLATION FOR LOCOMOTIVE TRACTION MOTOR CONTROL SYSTEM

[75] Inventors: Timothy Augustyniak, Meadville; Bryan M. Gromacki, Erie, both of Pa.

[73] Assignee: General Electric Company, Erie, Pa.

[21] Appl. No.: 168,610

[22] Filed: Dec. 16, 1993

[51] Int. Cl.$^6$ .................. H02P 1/54; H02P 3/12
[52] U.S. Cl. .................. 318/63; 318/380; 318/375
[58] Field of Search .................. 318/63, 138, 254, 318/439, 380, 379, 261, 375, 362

[56] References Cited

U.S. PATENT DOCUMENTS

| | | | |
|---|---|---|---|
| 3,967,175 | 6/1976 | Turley | 318/261 |
| 4,423,363 | 12/1983 | Clark et al. | 318/380 |
| 4,555,652 | 11/1985 | Brulard | 318/380 |
| 4,697,124 | 9/1987 | Schmitz | 318/63 |
| 5,140,232 | 8/1992 | Naito | 318/138 |

Primary Examiner—John W. Cabeca
Attorney, Agent, or Firm—Jill M. Breedlove; Marvin Snyder

[57] ABSTRACT

A locomotive traction motor control system includes a traction motor to propel a locomotive when it motors, and to slow the locomotive when it engages dynamic braking. A resistive element dissipates electrical energy generated during dynamic braking. A control element, operatively coupled to the resistive element, selectively isolates the resistive element from the tractor motor when the locomotive motors. The resistive grid isolation may be accomplished with a pair of isolation switches coupled in series between the traction motor and the resistive element and a controller which opens the isolation switches when the locomotive motors and closes the isolation switches when the locomotive engages dynamic braking.

10 Claims, 15 Drawing Sheets

BRAKING GRID ISOLATION FOR LOCOMOTIVE TRACTION MOTOR CONTROL SYSTEM

BACKGROUND OF THE INVENTION

This invention relates generally to traction motor control systems, and more particularly to traction motor dynamic braking systems in locomotives.

In a conventional diesel-electric locomotive, electric traction motors provide the motive force to move the train. Typically, a diesel engine drives an alternator, which supplies current to drive traction motors, which, in turn, propel the locomotive forward or backward. When propelled as such, a locomotive is said to be motoring.

The traction motors, however, perform an additional function. Once the locomotive is in motion, traction motors may be configured to generate electricity instead of consuming it. As generators, the traction motors convert the locomotive's kinetic energy into electrical energy, thereby slowing the locomotive. Using the traction motors to reduce speed is called dynamic braking. Because there is no suitable storage medium for the generated electrical energy, an electrically resistive grid, known as a braking grid or load box, is used to convert the electrical energy into heat energy, which is vented to the atmosphere.

In a typical diesel locomotive, a pair of traction motors are connected in parallel, and a resistive grid is connected in series between them. When the locomotive is motoring, the voltage drop across each traction motor is similar in magnitude and polarity, and as such, there is an insignificant voltage drop across the resistive grid. While using dynamic braking, however, the polarity of one of the traction motors is reversed, creating a substantial voltage drop across the resistive grid. Thus, in typical operation, the resistive grid is in constant electrical contact with the traction motors, yet dissipates energy only when the locomotive employs the dynamic braking technique.

A problem arises with conventional dynamic braking systems, however, when a resistive grid develops a short circuit to ground or to another element of the grid. Because the resistive grids are permanently coupled to the traction motors, a short circuit can interrupt the current flow to the traction motors. Consequently, the locomotive can be completely disabled by an element that isn't even involved in the actual propulsion of the locomotive. Short circuits may develop with water dripping into the resistive grid, or be caused by inadvertent damage during maintenance procedures. The likelihood of short circuits is enhanced by the fact that the grids are folded accordion style and packed tightly together to maximize heat transfer per area.

When a short develops, the massive amount of electrical energy generated to propel the locomotive is diverted to ground. Attempting to operate a locomotive with a grounded resistive grid practically ensures substantial damage to the locomotive's electrical generation and propulsion systems, as well as the resistive grid itself. Thus, a locomotive with a grounded resistive grid is completely disabled until the ground fault can be corrected.

SUMMARY OF THE INVENTION

Accordingly, it is a general object of the present invention to provide a traction motor control system that substantially overcomes the above mentioned problems.

It is also an object of the present invention to provide an improved traction motor control system that allows a locomotive to motor concurrently with a ground fault in a resistive grid.

It is a further object of the present invention to provide a traction motor control system that electrically isolates a resistive grid from a locomotive's traction motors when the locomotive is motoring, yet connects the resistive grid to the motors when the locomotive employs dynamic braking techniques.

In a locomotive traction motor control system, a traction motor converts electrical energy into kinetic energy when a locomotive motors and converts kinetic energy into electrical energy when the locomotive engages dynamic braking. A resistive element dissipates the electrical energy generated by the dynamic braking. A control element, connected to the resistive element, selectively isolates the resistive element from the traction motor when the locomotive motors.

The control element includes electronically controllable isolation switches, coupled in series between the traction motor and the resistive element, to selectively isolate the resistive element from the traction motor. The control element also includes a controller that automatically generates control signals to open the isolation switches when the locomotive motors and automatically generates control signals to close the isolation switches when the locomotive engages dynamic braking.

In another aspect of the invention, the resistive element may be used to test load a locomotive's power alternator (self-load). The resistive element is disconnected during motoring by electronically controlling the isolation switches, and is connected to the locomotive's alternator during self-load. Also, several fields of the traction motors are connected from the alternator during self-load. For example, three motor fields on a six axle locomotive are in the self-load circuit.

The isolation switches to implement the grid isolation and self-load functions are incorporated in a single, remotely controllable three position braking-motoring switch. The switch has at least one electronically controlled multi-state switch assembly which pneumatically moves a contact to an electrically isolated center position to facilitate grid isolation during motoring. An actuator moves the first contact toward the second contact and toward the third contact. A feedback mechanism responds to the movement of the first contact and generates position signals corresponding to motion of the first contact. An isolation position cam and microswitch provides a feedback signal to the controller indicating when the isolation switch is in its centered isolation position. The controller applies a stimulus signal to the actuator to move the first contact to the first state, applies another stimulus signal to the actuator to move the first contact to the second state, and selectively applies either of the stimulus signals to the actuator, in response to the position signals generated by the feedback mechanism, to move the first contact to a third isolation state.

In still another aspect of the present invention, the feedback mechanism on the braking-motoring switch includes a cam block which rotates in response to the actuator. The cam block includes a plurality of parallel cams, each having a cam profile. A plurality of microswitches respond to the movement of the cams, and generate position signals for the controller and operate to override the stimulus signals to the actuators to prevent overshooting of the first contact from the isolation position.

DESCRIPTION OF THE PREFERRED EMBODIMENTS

Figure 1:
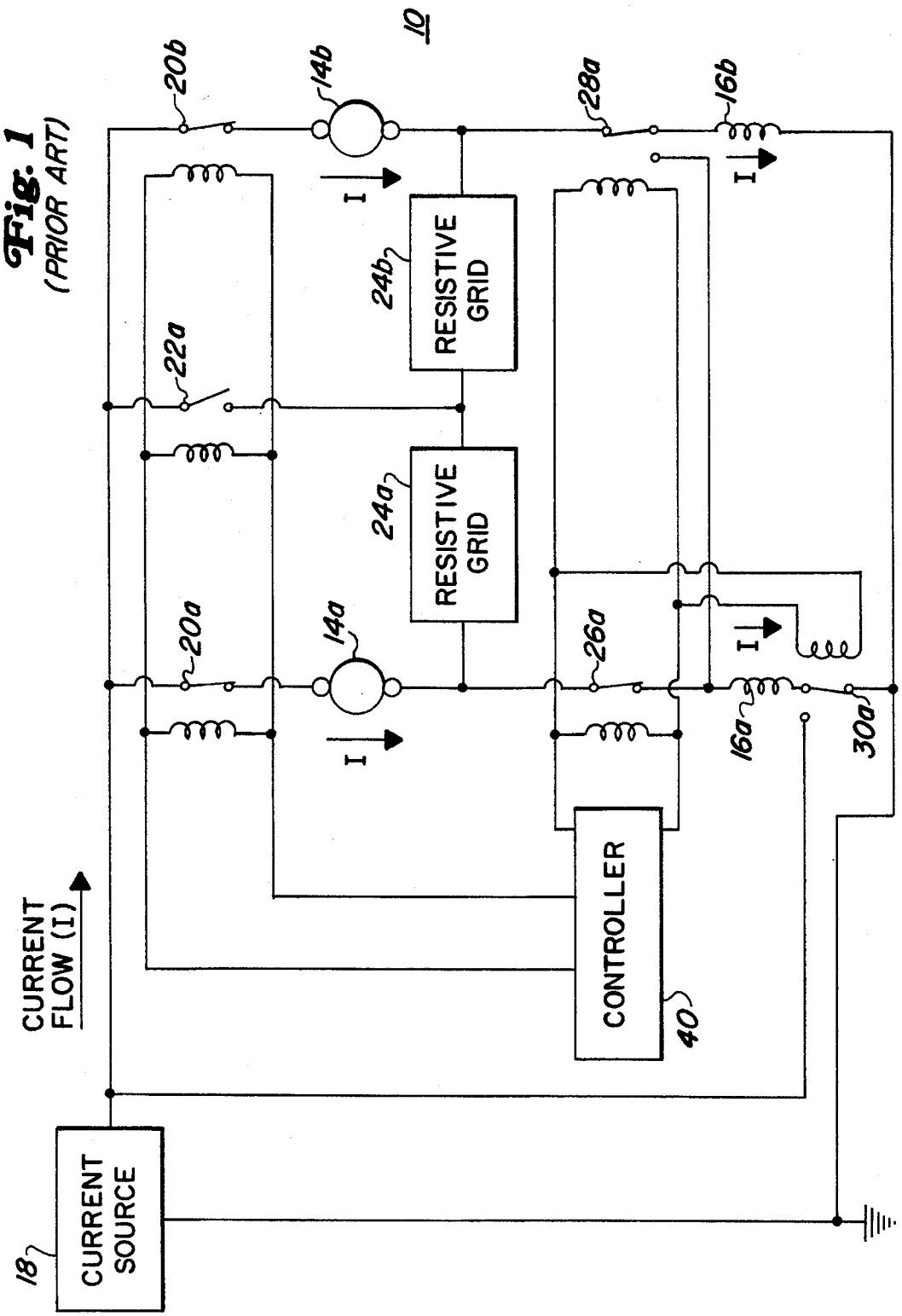
FIG. 1 is a block diagram of a traction motor control system when motoring in accordance with the prior art.

FIG. 1 is a block diagram depicting a conventional traction motor control system, generally indicated at 10, during motoring. The traction motor control system 10 includes two traction motors, depicted as their constituent components of armature windings, respectively designated 14a and 14b, and field windings, respectively designated 16a and 16b. A drive system containing fewer or greater traction motors is contemplated. A current source 18 (typically a diesel engine and alternator combination) provides power to the traction control system. Motor/brake switches, respectively designated 20a, and 20b, selectively connect the traction motor armature windings 14a and 14b to the current source 18 during motoring and braking. A self-load switch 22a also selectively connects the resistive grids, respectively designated 24a and 24b, to the current source 18. The resistive grids 24a, 24b are connected such that in a dynamic braking mode, the grids are in series and in the self-load mode the resistive grids are in parallel, with the armature windings 14a, 14b at a terminal opposite the current source 18.

A braking switch 26a selectively connects the first traction motor armature winding 14a to the first traction motor field winding 16a. Similarly, a braking switch 28a selectively connects the second traction motor armature winding 14b to the second traction motor field winding 16b. A braking switch 30a selectively connects the first traction motor field winding 16a to the current source 18 return path, completing the circuit.

When motoring, therefore, the current flow in the traction motors are the same. The first traction motor armature windings 14a and 14b are similar devices, connected in parallel across common voltage points, so the voltage drop across each armature winding 14a and 14b is substantially equal. Since the armature windings 14a, 14b are connected to the same potential on one side, and experience similar voltage drops, the sides of the armature windings opposite the current source 18 must also be at the same voltage. With no difference in voltage potential across the resistive grids 24a, 24b, very little, if any, power is dissipated across the grids 24a, 24b.

A controller 40 generates control signals that operate motor/brake switches 20a, 20b, and self load switch 22a, and braking switches 26a, 28a, and 30a. The controller responds to inputs from the locomotive operator, and configures the switches to place the locomotive in the appropriate mode. For example, if the operator wishes to reduce the locomotive's velocity, the engineer merely selects a different notch on the control panel. The controller determines how to achieve the change in speed (i.e., coast, engage dynamic braking, etc).

Figure 2:
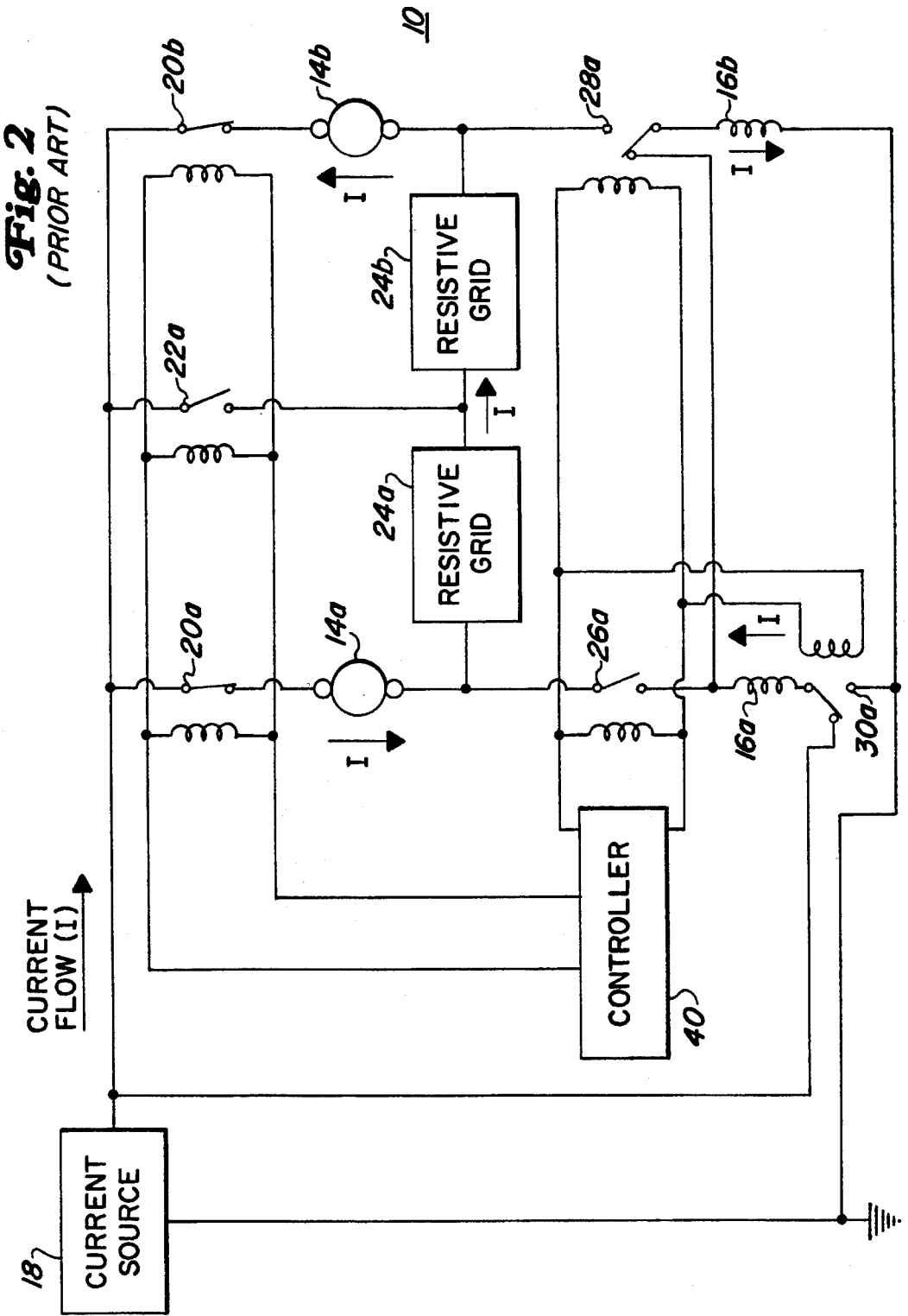
FIG. 2 is a block diagram of a traction motor control system under dynamic braking in accordance with the prior art.

Referring now to FIG. 2, a block diagram depicts a conventional traction control system engaged in dynamic braking. Dynamic braking is achieved by changing the states of braking switches 26a, 28a, and 30a. When braking, braking switch 26a disconnects the first traction motor armature winding 14a from its field winding 16a. Similarly, braking switch 28a disconnects the second traction motor armature winding 14b from its field winding 16b. Braking switch 28a also establishes a serial connection between the two field windings 16a, 16b. Braking switch 30a disconnects the field winding 16a of the first traction motor 12a from the current source 18 return path and instead establishes a connection directly to the current source 18 itself.

During dynamic braking, the polarity of the first traction motor field winding 16a is reversed, thereby opposing the first armature winding 14a. As the rolling locomotive forces the traction motor armatures 14a, 14b, to rotate, they produce voltages similar in magnitude but opposite in polarity. Thus, the voltage across the resistive grids, 24a and 24b, is the sum of the voltages produced by the two traction motor armature windings 14a, 14b. The current produced by the traction motors is then dissipated by the resistive grids 24a, 24b.

Figure 3:
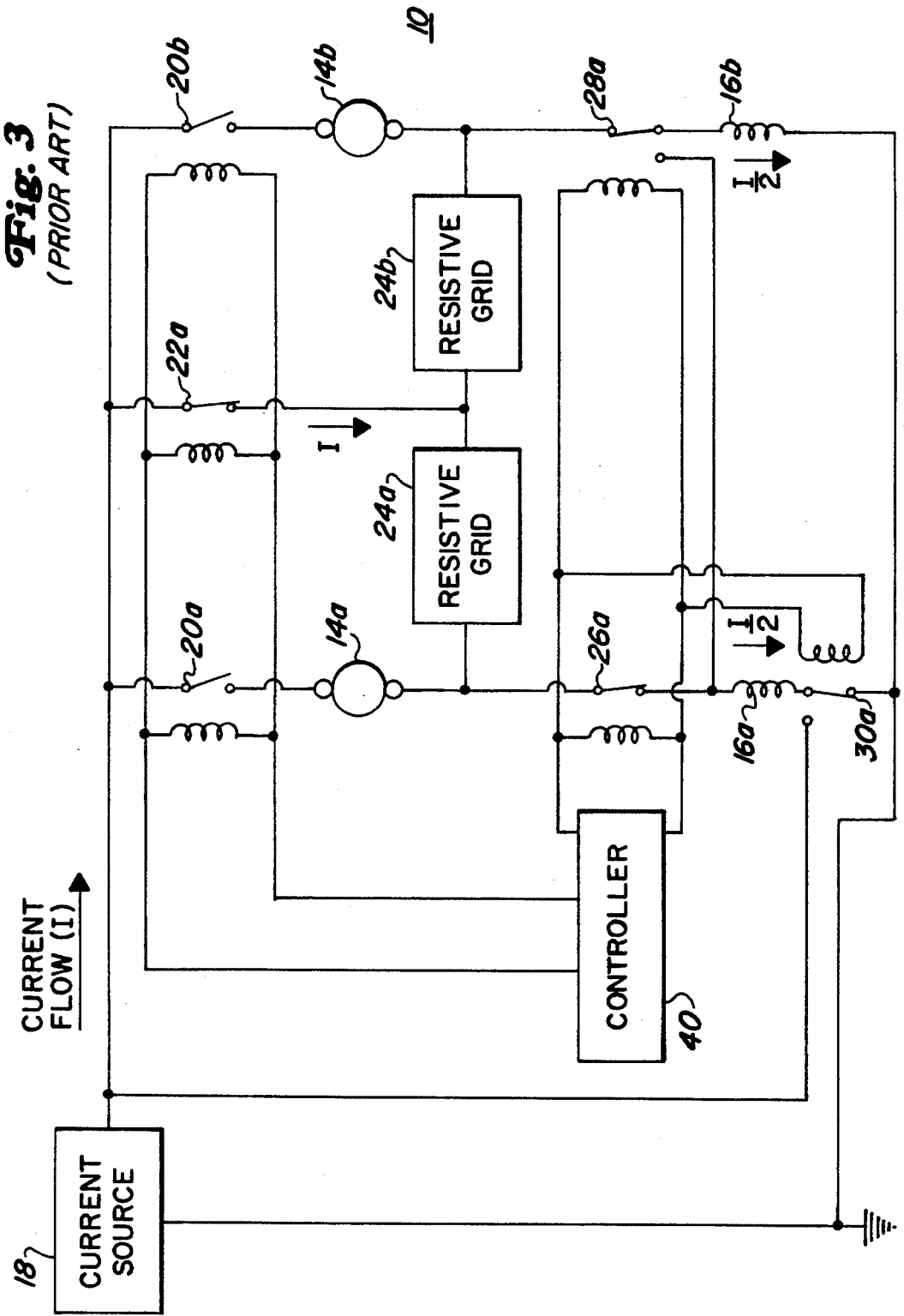
FIG. 3 is a block diagram of a traction motor control system under self-load in accordance with the prior art.

Referring now to FIG. 3, a block diagram depicts a conventional traction control system during self-load test. The braking switches, 26a, 28a, and 30a, are configured as if motoring, but motor/brake switches 20a, 20b have opened to disconnect the armature windings 14a, 14b from the current source 18. self-load switch 22a is closed to connect the resistive grids 24a and 24b to the current source 18. The current source 18 and the resistive grids 24a and 24b may now be tested without moving the locomotive.

In normal operation, therefore, the resistive grids 24a and 24b may remain in electrical contact with the traction motors without adverse effects. The resistive grids 24a and 24b dissipate energy only during braking and self-load, and, absent a fault, there is no need to isolate them during motoring.

Figure 4:
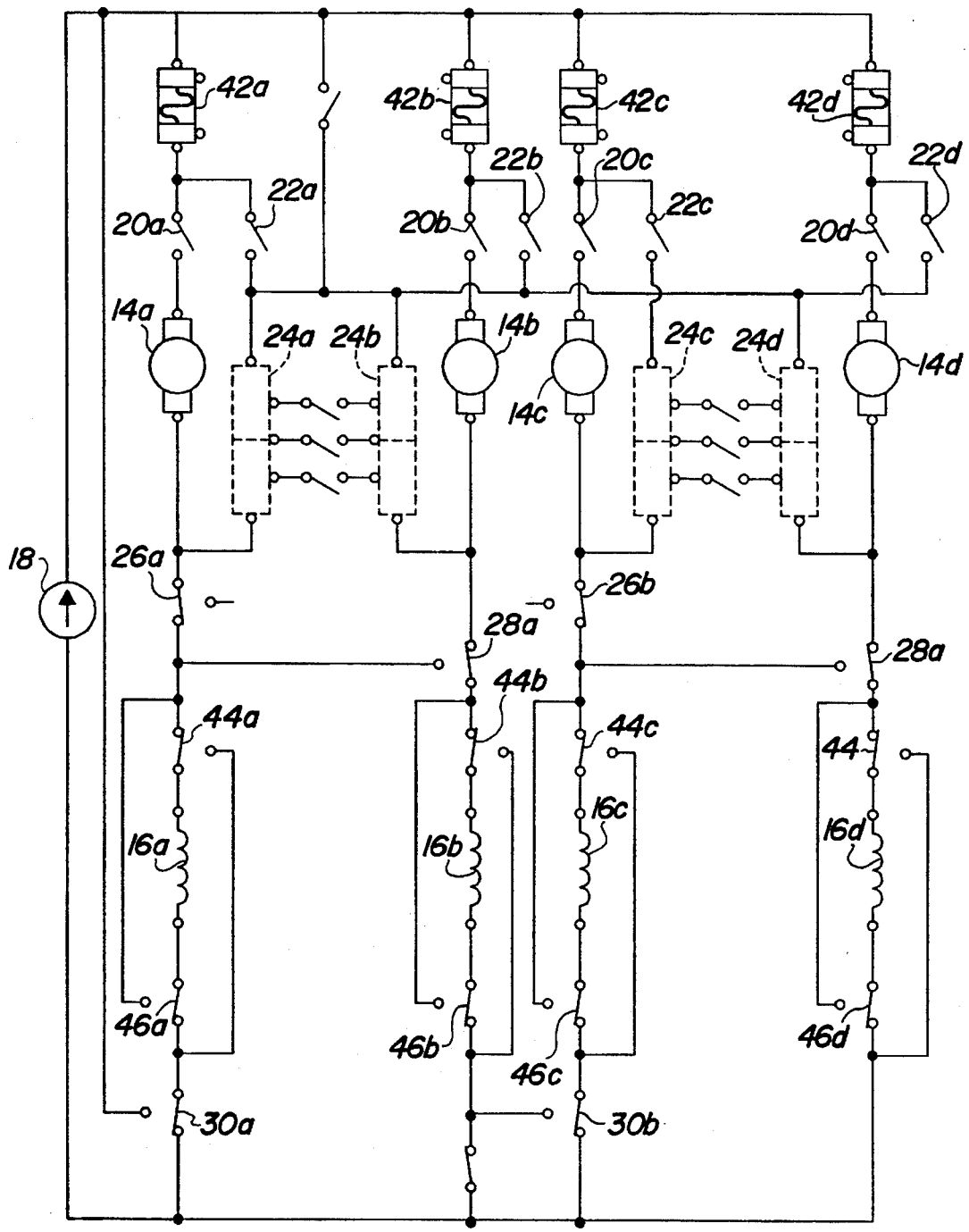
FIG. 4 is a schematic diagram of a traction motor control system showing a typical application in accordance with the prior art.

Referring now to FIG. 4, a schematic diagram shows a traction motor control system according to the prior art. This particular installation is essentially two interconnected circuits as described in FIG. 1. The controller 40 and associated control circuitry are omitted for clarity. A typical implementation of a traction motor control system includes four traction motors, depicted by their constituent components, armature windings 14a, 14b, 14c, and 14d, and field windings 16a, 16b, 16c, and 16d. Interconnection is accomplished with motor/brake switches 20a, 20b, 20c, 20d, self-load switches 22a, 22b, 22c, and 22d, and braking switches 26a, 26b, 28a, 28b, 30a, and 30b.

Additional typical equipment includes current sensors, respectively designated 42a, 42b, 42c, and 42d, to determine the amount of current passing through the traction motor armatures, 14a, 14b, 14c, and 14d. The typical implementation also includes reverse relays, respectively designated 44a, 44b, 44c, 44d, 46a, 46b, 46c, and 46d, to reverse the field currents and allow the locomotive to motor in reverse.

Figure 5:
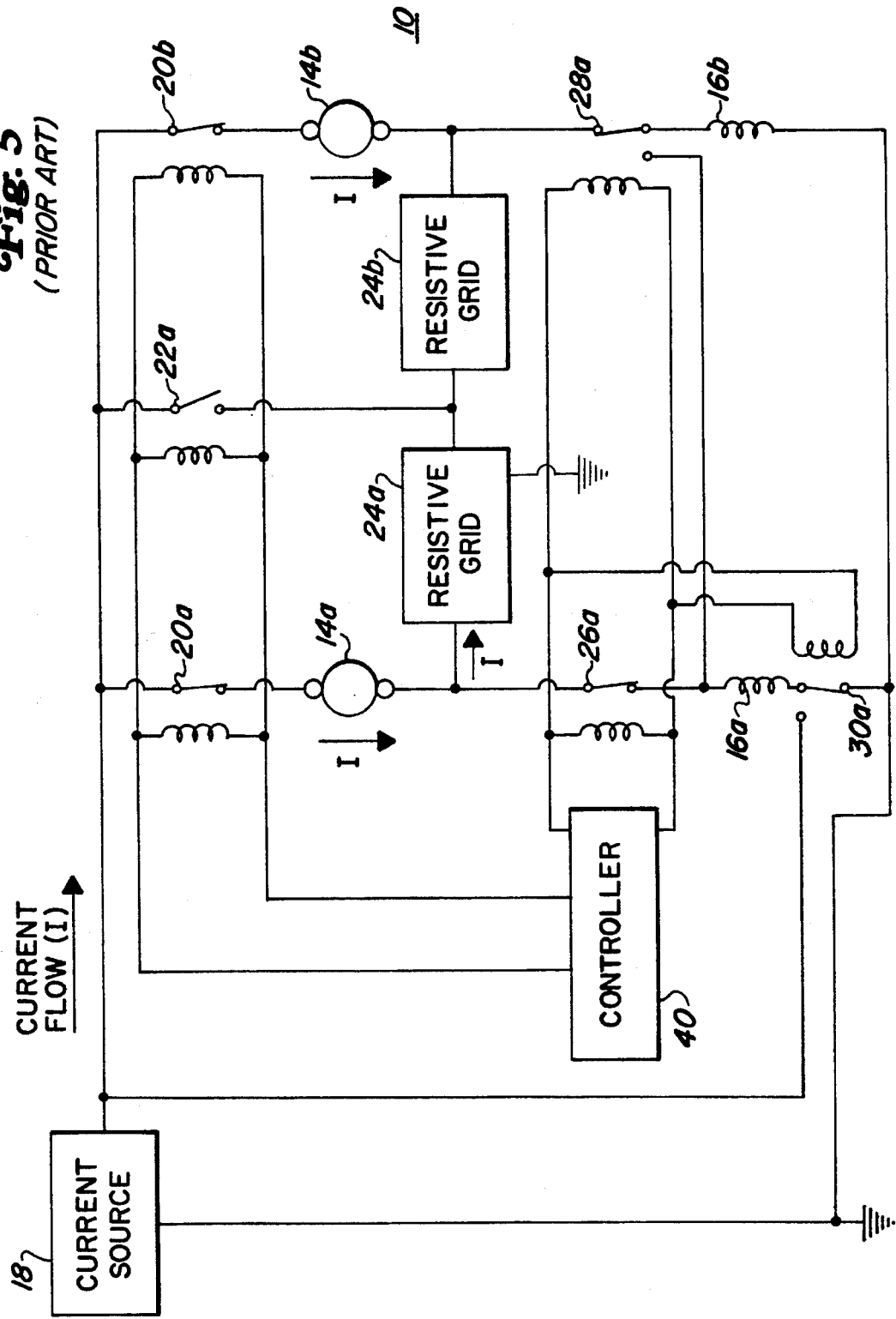
FIG. 5 is a block diagram of a traction motor control system with a resistive grid fault when motoring in accordance with the prior art.

A fault in a resistive grid, however, can completely disable a conventional locomotive until the fault can be corrected. For example, a short to ground in the first resistive grid 24a would cause the associated traction motor to fail. Referring now to FIG. 5, a block diagram shows a traction motor control system 10 with a ground fault in a resistive grid 24a. Attempting to motor a locomotive in this condition would cause the current in the first traction motor's field windings 16a to collapse, and excessive current would flow though its armature windings 14a, damaging the armature and/or destroying the grid.

Figure 6B:
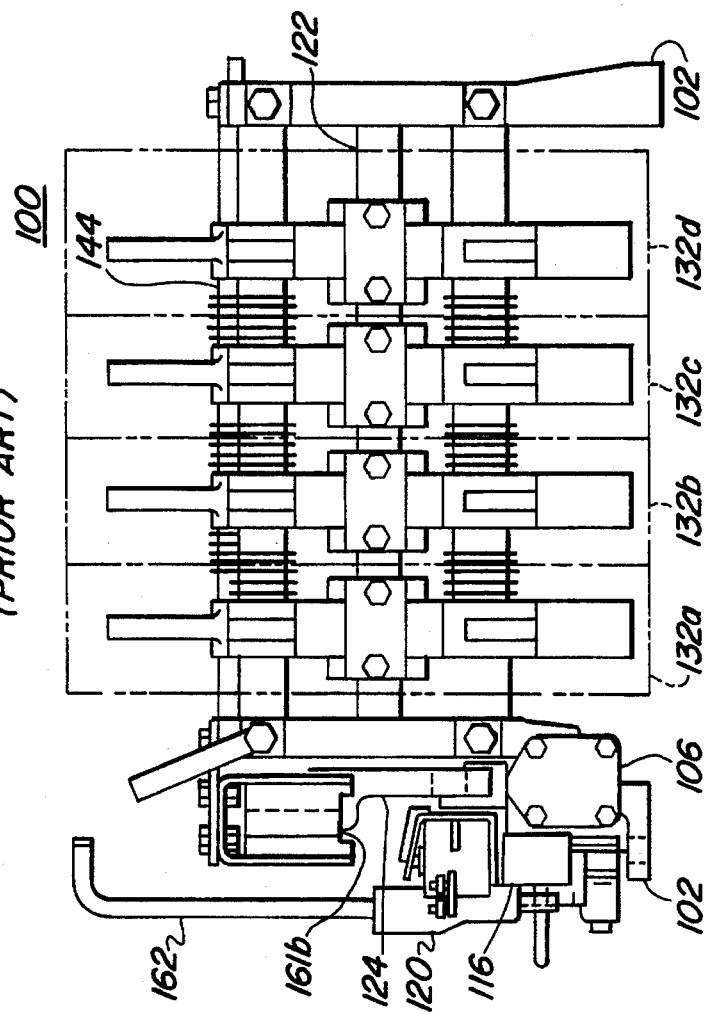
FIGS. 6A and 6B are mechanical drawings of a braking switch in accordance with the prior art.
Figure 6A:
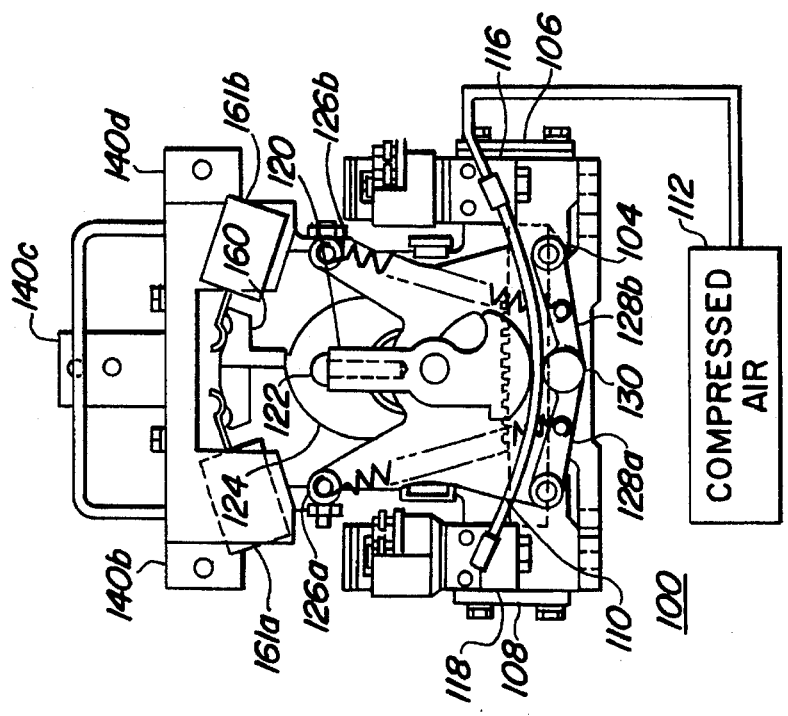

FIGS. 6A and 6B show a conventional braking switch, generally indicated at 100, such as Part No 17GP31D1, available from GE Transportation Systems, Erie Pa. The braking switch 100 is an electronically controlled, 2 position, pneumatically actuated switch capable of conducting high current loads (in excess of 800 Amperes). The conventional braking switch 100 also has a manually selectable center position which is used to allow maintenance personnel to clean contacts on the switch.

A switch frame 102 supports the major components in the braking switch 100. A toothed rack 104 mechanically connects a braking air chamber 106 to a self-load air chamber 108. An air conduit 110 connects the two chambers 106 and 108 pneumatically. A supply of compressed air 112 provides air pressure for the two chambers 106 and 108 via the air conduit 110. A braking solenoid 114 and air valve combination selectively admits compressed air from the air conduit 110 to the braking air chamber 106. Similarly, a self-load solenoid 116 and air valve combination selectively admits the compressed air from the air conduit 110 to the self-load air chamber 108.

The controller 40 (FIGS. 1–5) can electronically effect a change in the braking switch 100 between two positions by applying a continuous energizing stimulus signals 117 and 119 to either the braking or the self-load solenoids 116 and 118, respectively. The braking and self-load solenoids 116 and 118 effect changes in switch settings through a mechanical linkage as follows. Admitting compressed air to one of the air chambers, 106 and 108, causes the toothed rack 104 to move away from the pressurized chamber. The toothed rack 104 is connected to a star wheel 120. The star wheel 120 is operatively connected to a common shaft 122 by a claw assembly 124. When movement of the toothed rack 104 causes the star wheel 120 to rotate, the claw assembly 124 causes the common shaft 122 to rotate in the opposite direction of the star wheel 120. Springs 126a and 126b, pawls 128a and 128b, and a roller 130 provide positive mechanical feedback to the rotation of the star wheel 120. The springs 126a and 126b apply tension to the pawls 128a and 128b and, therefore, the roller 130 that connects the pawls 128a and 128b. The springs 126a and 126b force the roller 130 into contact with the star wheel 120.

The star wheel 120 is shaped to accept the roller 130, and provides two controller 40 selectable detent positions, braking and self-load. The star wheel 120 also provides a manually selectable center detent position, interposed between braking and self load, for maintenance purposes. When the braking switch 100 is not in one of these three detent positions, the roller 130 will force the star wheel 120 into the closest detent position. It is to be noted that the moving force generated by a pressurized air chamber, 106, 108, is sufficient to move the star wheel 120 out of a detent position.

Figure 11:
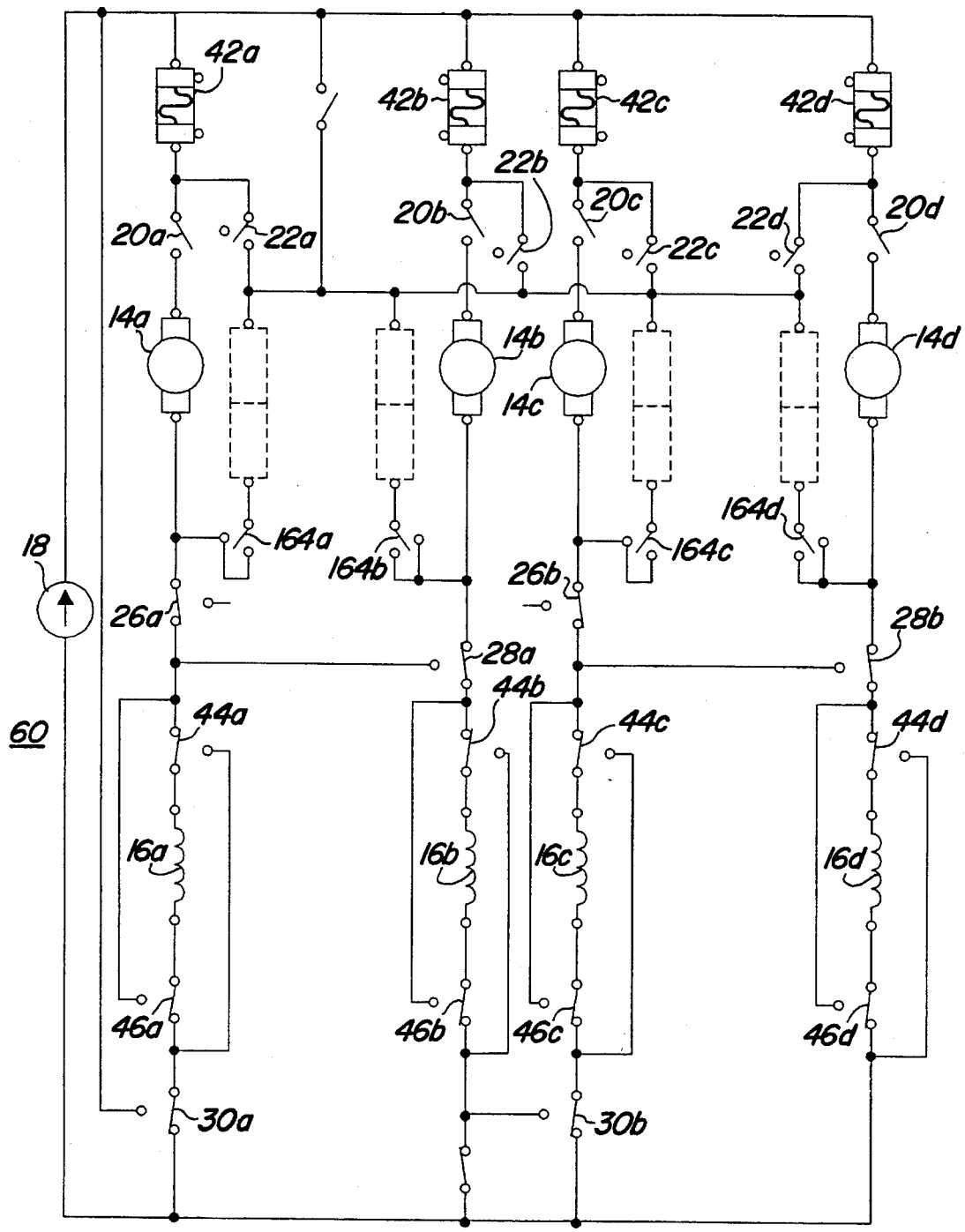
FIG. 11 is a schematic diagram of a traction motor control system showing an application in accordance with the present invention.

Referring now to FIG. 6B, four switch assemblies, respectively designated 132a, 132b, 132c, and 132d, are connected to the common shaft 122. Insulators, designated 134, mechanically stabilize the switch assemblies 132a–d, while electrically isolating them from each other. FIG. 11 shows a representative switch assembly, generally indicated at 132a. Terminal bars 140a, 140b, 140c, 140d, and 140e provide connection points for high current locomotive bus bars (not shown). Terminal bar 140a is coupled to a fixed end 142a of contact finger 144a, terminal bar 140b is coupled to a braking contact 150, terminal bar 140c is coupled to a center contact 152, terminal bar 140d is coupled to a self-load contact 154, and terminal bar 140e is coupled to a fixed end 142b of contact finger 144b.

The contact fingers, 144a and 144b, also include movable ends 146a and 146b, respectively. The moveable ends 146a and 146b are mechanically connected to, but electrically isolated from, the common shaft 122 by anchors 148a and 148b. When the common shaft 122 rotates fully clockwise, moveable end 146a makes electrical contact with center contact 152 and movable end 146b makes electrical contact with self-load contact 154. When the common shaft 122 rotates fully counter-clockwise, moveable end 146a makes electrical contact with braking contact 150 and movable contact 146b makes electrical contact with center contact 152. Thus, rotation of the common shaft 22 makes and breaks electrical contact between the movable ends 146a and 146b and the contacts 150, 152, and 154.

Referring back to FIG. 6A, confirmation of the position of common shaft 122 is accomplished with rocker cam 160 and position switches 161a and 161b. The position switches 161a and 161b are mounted one to each side of the mechanical linkage and provide input signals to the controller 40. When the star wheel 120 is in the braking detent, the common shaft 122 rotates the rocker cam 160 to engage position switch 161a. When the star wheel 120 is in the self-load detent, the common shaft 122 rotates the rocker cam 160 to engage position switch 161b. When the star wheel 120 is in the manually selectable center detent, the rocker cam 160 engages neither position switch 161a nor position switch 161b.

Figure 7:
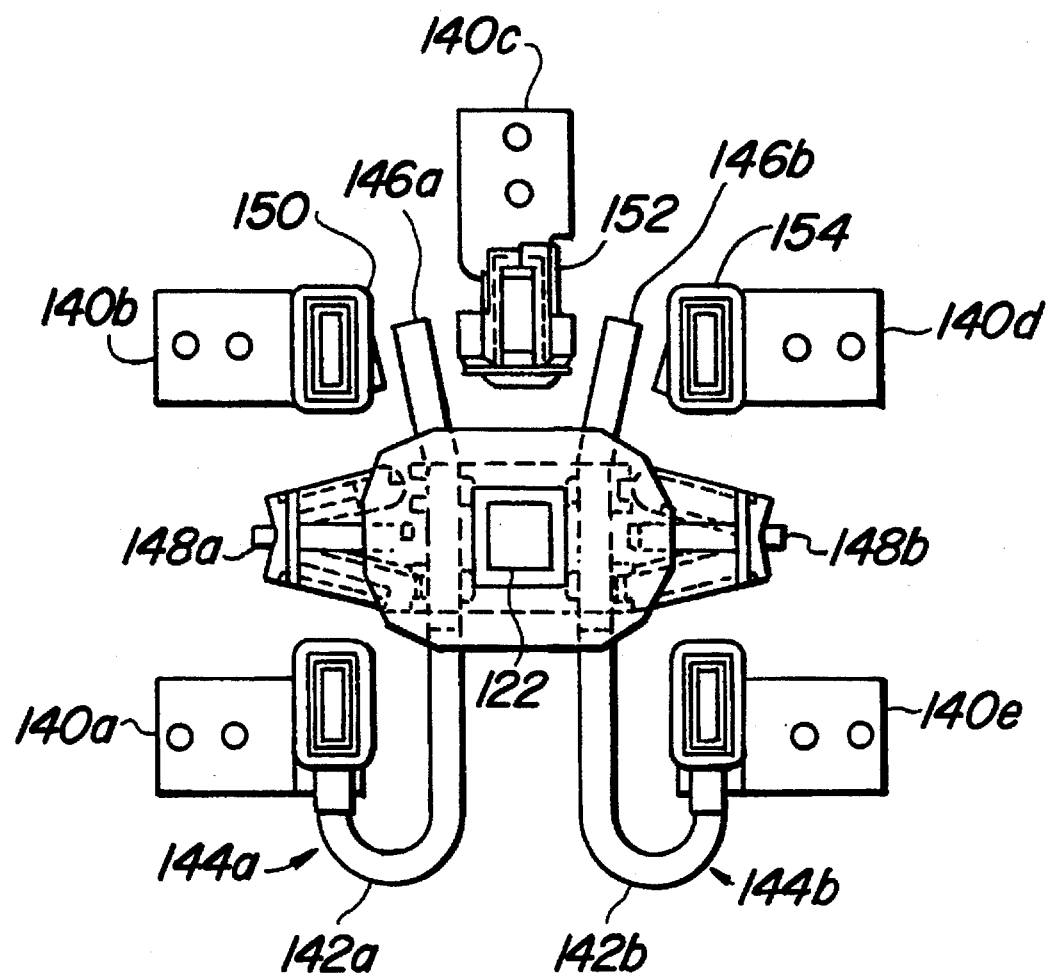
FIG. 7 is a mechanical drawing of a switch assembly in accordance with the prior art.

The controller 40 configures the braking switch 100 to engage braking by applying a continuous energizing stimulus signal 117 to the braking solenoid 116. The energized braking solenoid 116 admits compressed air into the air chamber 106, forcing the toothed rack 104 to the left, thereby causing star wheel 120 to rotate clockwise. The claw assembly 124 responds to the movement of the star wheel 120, and causes the common shaft 122 to rotate counter-clockwise. Referring back to FIG. 7, the rotating common shaft 122 causes the moveable ends 146a and 146b to move between contacts 150, 152, and 154. When the star wheel 120 reaches the braking detent, the common shaft 122 couples moveable end 146a, in each respective switch assembly 132a, 132b, 132c, and 132d, to braking contact 150 and couples movable end 146b to center contact 152.

The controller 40 configures the braking switch 100 to engage self-load by de-energizing braking solenoid 116 and applying a continuous energizing stimulus signal 119 to the self-load solenoid 118, which admits compressed air from the air conduit 110 into the air chamber 108, forcing the toothed rack 104 to the right, thereby causing star wheel 120 to rotate counter-clockwise. The claw assembly 124 responds to the movement of the star wheel 120, and causes the common shaft 122 to rotate clockwise. Referring back to FIG. 7, the rotating common shaft 122 causes the moveable ends 146a and 146b to move between contacts 150, 152, and 154. When the star wheel 120 reaches the self-load detent, the common shaft 122 couples moveable end 146a to center contact 152 and couples movable end 146b to self-load contact 154.

In addition to the two electronically selectable positions of braking and self load, there is a third, manually selectable center position, provided for maintenance purposes. Locomotive maintenance personnel can manually select the center position by using a handle 162, to manually rotate the star wheel 120, and therefore the switch shaft 122, until the roller 130 slides into center detent of the star wheel 120. When the star wheel 120 is in the center detent, the movable ends 146a and 146b (FIG. 7) are isolated. The controller 40 does not select the centered position because energizing either the braking solenoid 116 or the self-load solenoid 118 will rotate the braking switch 100 to its fullest rotation. In a conventional application, therefore, manual actuation is required to obtain the centered position and the conventional switches do not center automatically.

Figure 8:
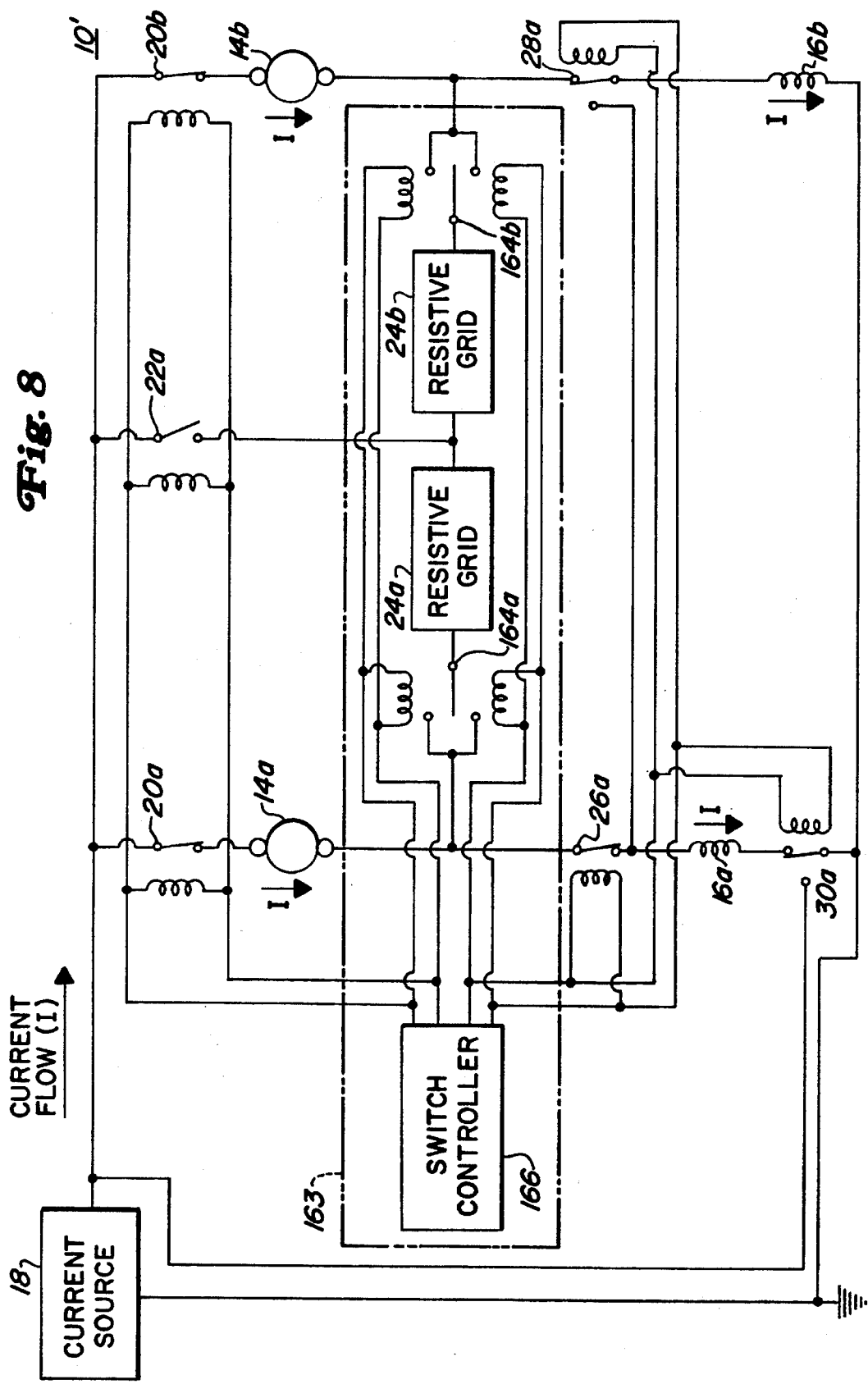
FIG. 8 is a block diagram of a traction motor control system during motoring in accordance with the present invention.

Referring now to FIG. 8, a block diagram shows a traction motor control system, generally indicated at 10', during motoring according to the present invention. The present invention solves the grounded grid problem by electronically and automatically isolating the resistive grids 24a and 24b from the traction motors during motoring with a traction motor controller 163. The traction motor controller 163 includes novel grid isolation switches, respectively designated 164a and 164b, connected in series between the resistive grids 24a and 24b, and their respective armature windings 14a and 14b, and also includes a switch controller 166. In the preferred embodiment, the switch controller 166 undertakes all of the control functions of the prior art controller 40 as well as the resistive grid isolation control.

As will be described in detail later, the isolation switches 164a and 164b are adapted for electronically moving to a center position which allows the switch controller 166 to electronically and automatically isolate the resistive grids 24a and 24b from the traction motor armature windings 14a and 14b. As a result, the controller selectable isolation position allows a locomotive to motor even when there is a fault in one of the resistive grids 164a and 164b.

Figure 9:
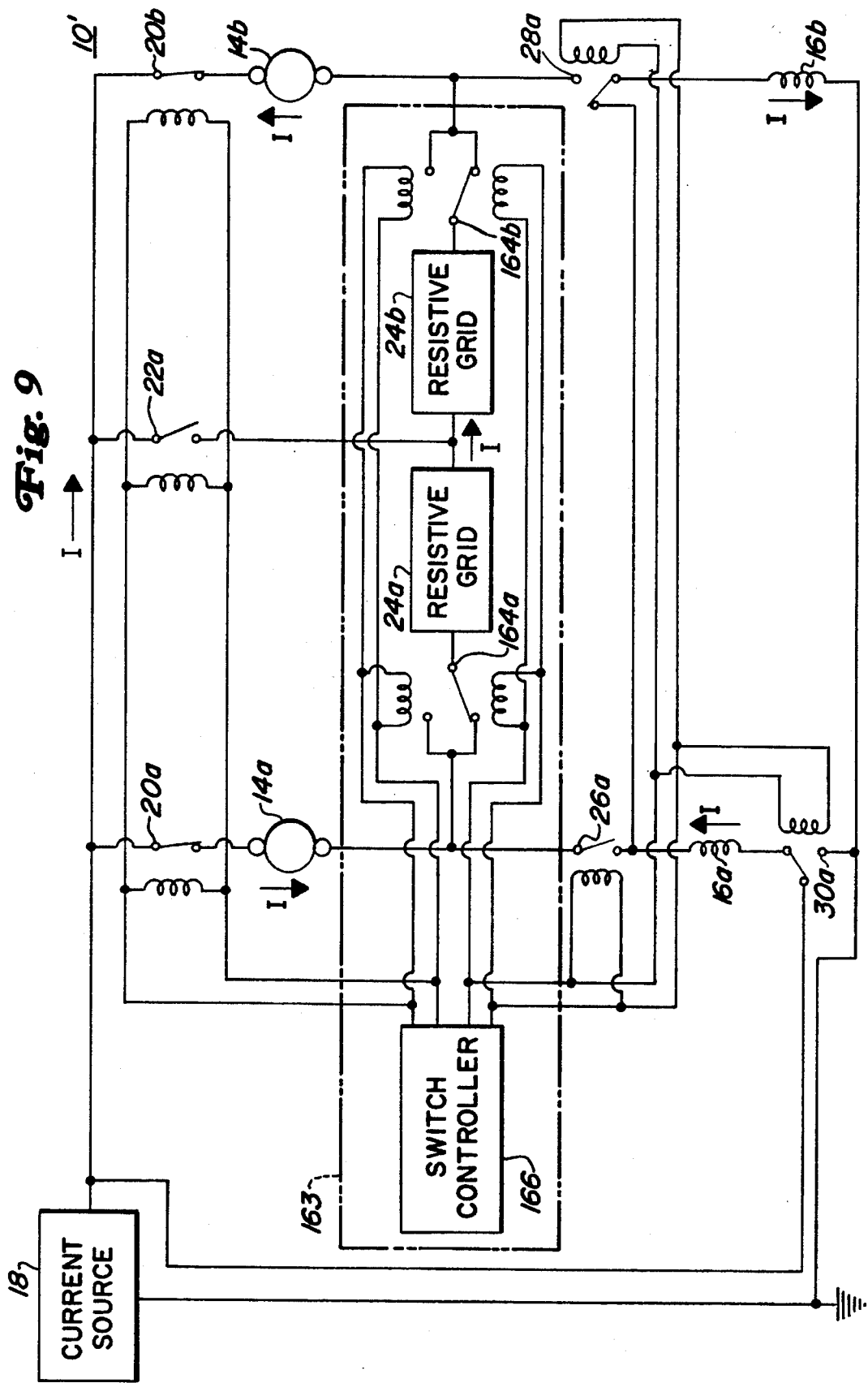
FIG. 9 is a block diagram of a traction motor control system under dynamic braking in accordance with the present invention.

Referring now to FIG. 9, a block diagram shows a traction motor control system 10' during dynamic braking according to the present invention. The switch controller 166 configures the isolation switches 164a and 164b to couple the resistive grids 24a and 24b to the traction motor armature windings 14a and 14b. Current generated by the traction motor armature windings 14a and 14b, is then dissipated by the resistive grids 24a and 24b.

Figure 10:
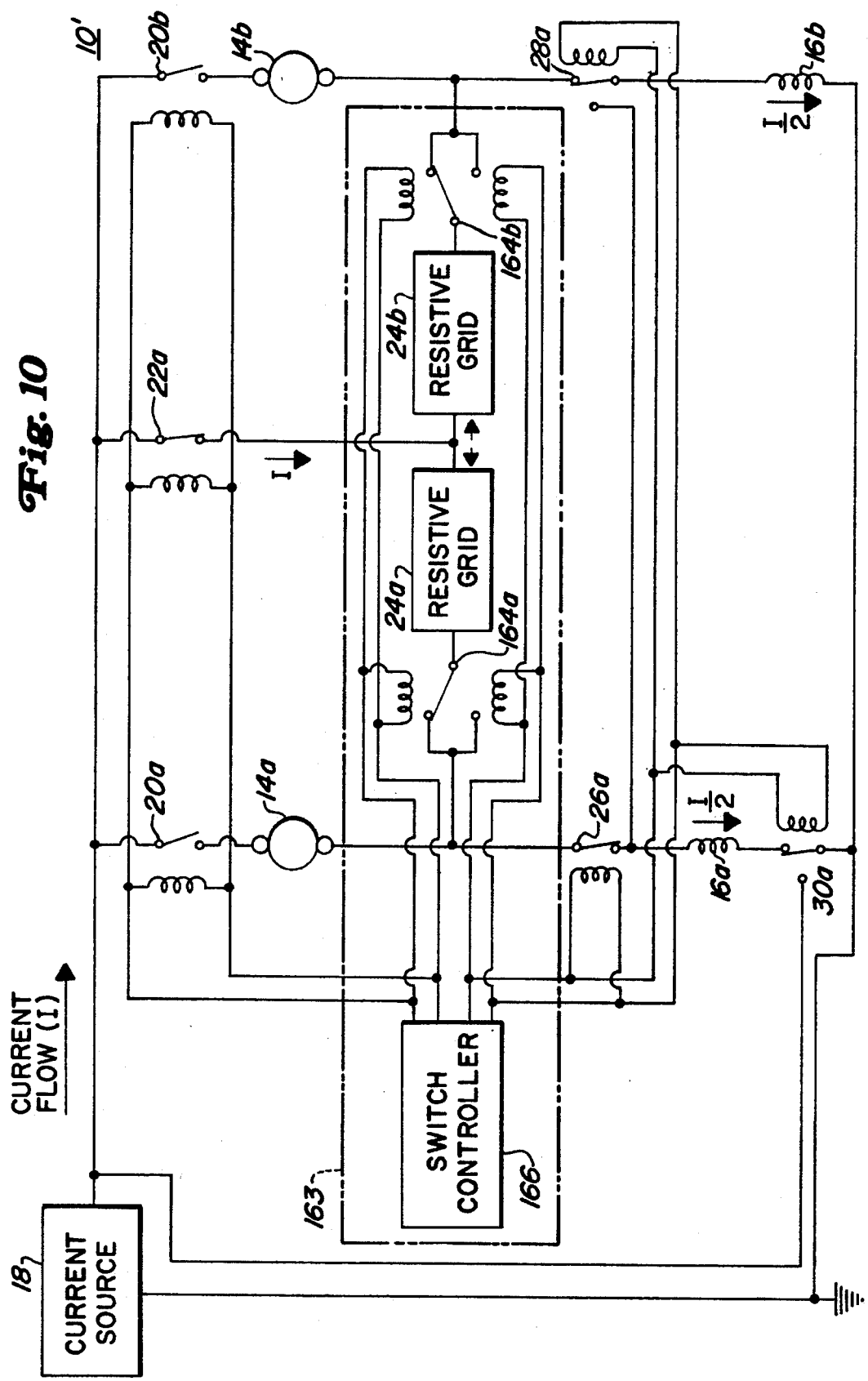
FIG. 10 is a block diagram of a traction motor control system under self-load in accordance with the present invention.

Referring now to FIG. 10, a block diagram shows a traction motor control system 10' during a self-load test according to the present invention. The switch controller 166 configures the isolation switches 164a and 164b to couple the resistive grids 24a, 24b to the traction motor armature windings 14a and 14b. The braking switches are configured as if motoring, but motor/brake switches 20a and 20b have opened to disconnect the armature windings 14a and 14b from the current source 18. Self-load switch 22a is closed to connect the resistive grids 24a and 24b to the current source 18. The current source 18 and resistive grids 24a, 24b, may now be tested without moving the locomotive.

Referring now to FIG. 11, a schematic diagram shows a traction motor control system according to the present invention. The controller 166 and associated control circuitry are omitted for clarity. This particular installation includes four traction motors, and is essentially the traction motor control system 10' depicted in FIG. 4 with the addition of the isolation switches 164a, 164b, 164c, and 164d.

Figure 12B:
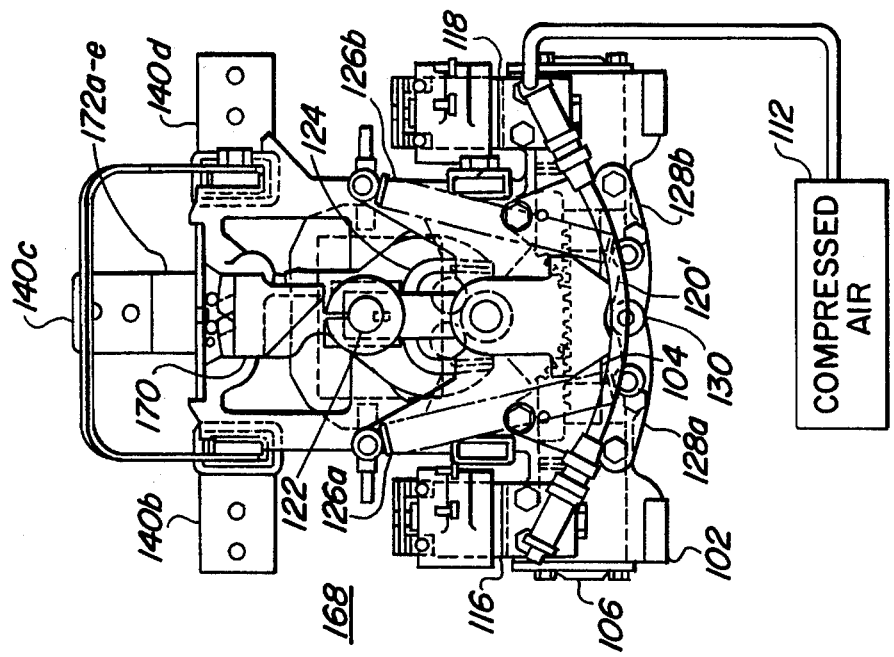
FIGS. 12A and 12B are mechanical drawings of a braking-motoring switch in accordance with the present invention.
Figure 12A:
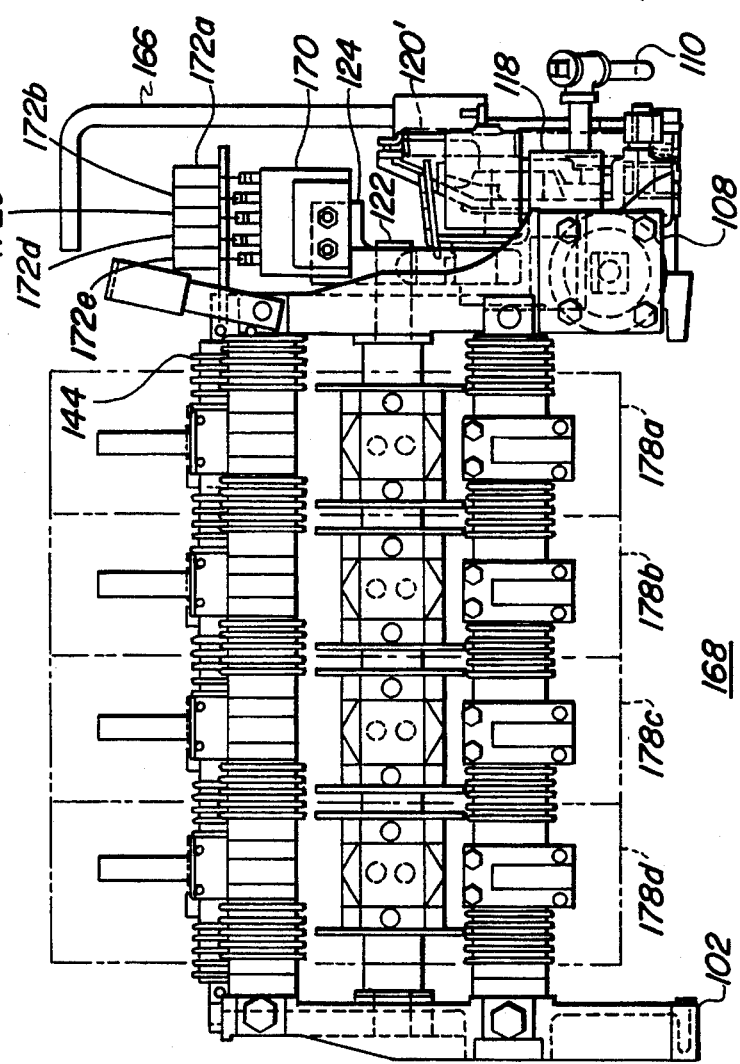

Referring now to FIGS. 12A and 12B, the present invention uses an electronically controllable, high current, two pole, three position multi-switch 168. The switch is referred to herein as a braking-motoring switch (BMS). The BMS 168 includes a cam block 170 and microswitches 172a–172e to allow the controller 166 to electronically and automatically position contacts in the BMS 168 to isolate the braking grids 24a and 24b (FIG. 8) from the traction motor armatures 14a and 14b (FIG. 8). As will be discussed later, all of the motor/brake switches 20a–d (FIG. 11) and resistive grid isolation switches 164a–d (FIG. 11) are incorporated in a single BMS 168. The BMS 168 includes many of the same components of the conventional braking switch 100, but differs in the following respects.

First, referring to FIG. 12B, the BMS 168 replaces the rocker cam 160 (FIG. 6A) and the position switches 161a and 161b (FIG. 6A) with a cam block 170, and microswitches 172a–172e. Preferably, the microswitches are dual-pole, single-throw switches. Alternate poles for microswitches 174a–e are indicated herein by a prime ('). For example, when switch 172a is closed, alternate pole in switch 172a' is open. The microswitches may be Schaltbau Part No. S826 switches, available from Transatlantic Marketing Co., Huntington, N.Y. The microswitches 172a–e are mounted above the mechanical linkage to actuate in response to movement of the cam block 170.

Figure 13:
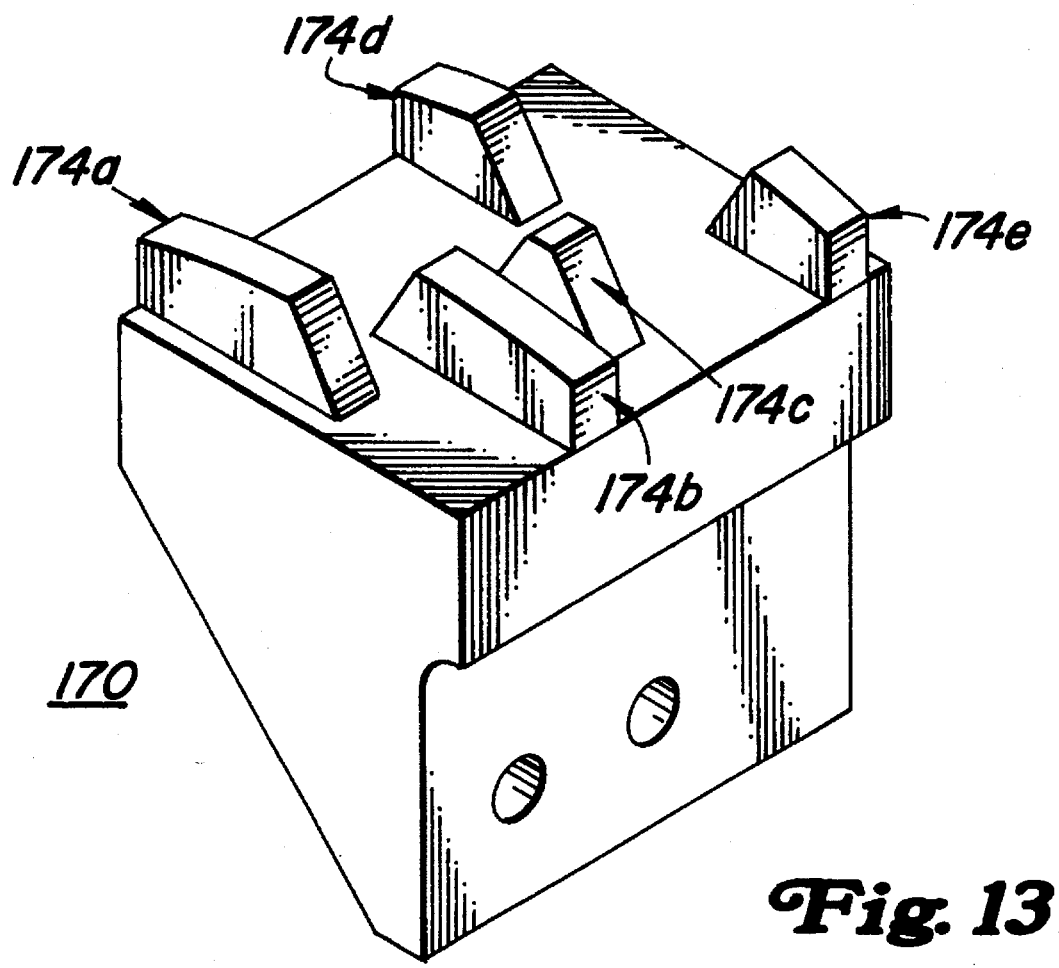
FIG. 13 is a perspective drawing of a cam block in accordance with the present invention.

Referring to FIG. 13, the cam block 170 includes a self-load to motoring cam 174a, a brake to motor cam 174b, a motor position cam 174c, a self-load position cam 174d, and a brake position cam 174e. The cams 174a–e protrude above the surface of the cam block 170 and are arranged parallel to each other. Moreover, the cams 174a–e, are arranged parallel to the direction of rotation of the cam block 170.

Referring back to FIG. 12B, the cam block 170 is connected to, and arcuately rotates with, the common shaft 122. As the common shaft 122 rotates, the cams 174a–174e engage and release the microswitches 172a–172e, respectively. The microswitches 172a–e operate to facilitate automatic electrical grid isolation. The microswitches 172a–e include rollers, 176a–e, respectively, to facilitate following of the cam profiles.

Figure 14:
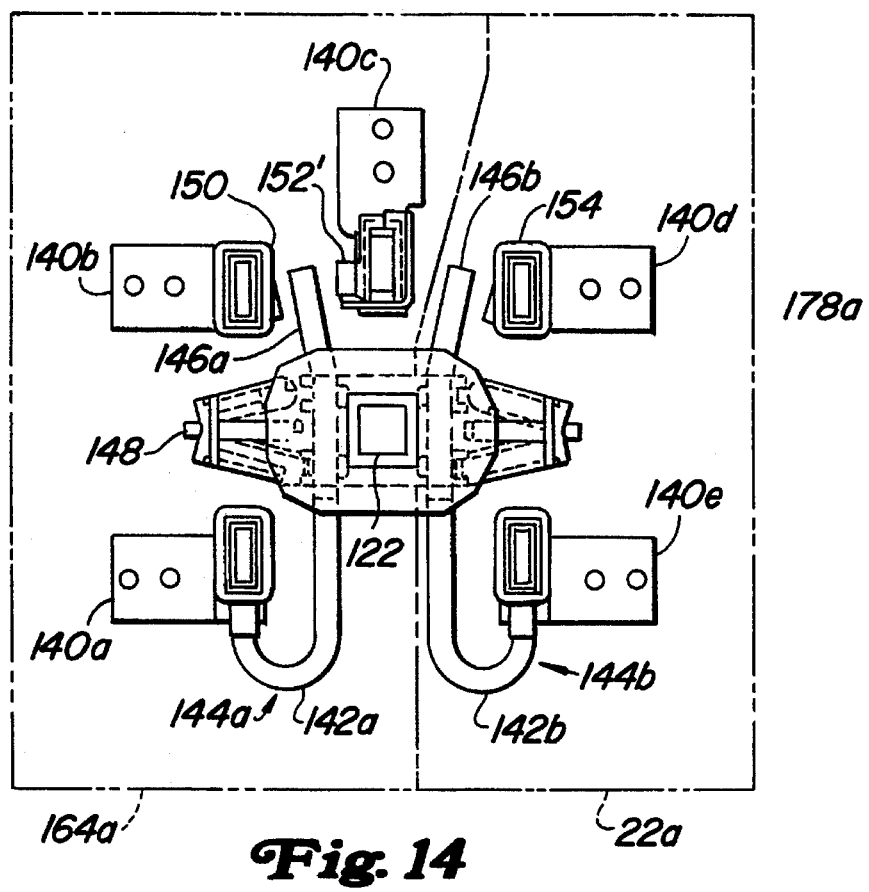
FIG. 14 is a mechanical drawing of a switch assembly in accordance with the present invention.

The switch assemblies 178a–d are configured as follows. Referring to FIG. 14, a representative switch assembly is generally depicted at 178a. Terminal bars 140a, 140b, and 140c, in combination with fixed end 142a and movable end 146a, form an isolation switch 164a. Terminal bars 140d and 140e, in combination with fixed end 142b and movable end 146b, form a self-load switch 22a. When the star wheel 120' is in the braking detent, moveable end 146a is coupled to braking contact 150 and movable end 146b is isolated. When the star wheel 120' is in the self-load detent, moveable end 146a is coupled to center contact 152' and movable end 146b is coupled to self-load contact 154. Finally, when the star wheel 120' is in the center detent, the movable ends 146a and 146b are isolated. There are four such switch assemblies, respectively designated 178a–d, on the BMS 168. Thus, self-load switches 22a–d, as well as isolation switches 164a–d, are contained in a single BMS 168 and are activated by control signals through control lines.

Referring to FIGS. 9 and 14, the controller 166 operates the BMS 168 as follows. During motoring, the controller 166 sets the BMS to the center isolation position, thus disconnecting the resistor grids 24a, 24b, 24c, and 24d completely. During braking, the controller 166 throws the BMS to braking, closing isolating switches 164a, 164b, 164c, and 164d, and thereby connecting the resistor grids 24a, 24b, 24c, and 24d across their respective traction motors 12a, 12b, 12c, and 12d. During self-load, the controller 166 throws the BMS 168 to the opposite side, closing self-load switches 22a, 22b, 22c, and 22d, as well as closing isolating switches 164a, 164b, 164c, and 164d, thereby connecting the resistor grids 24a, 24b, 24c, and 24d across the current source 18. Thus, the braking grid is isolated from the traction motors during motoring (center detent) and connected to the traction motors during braking and self-load.

Figure 16:
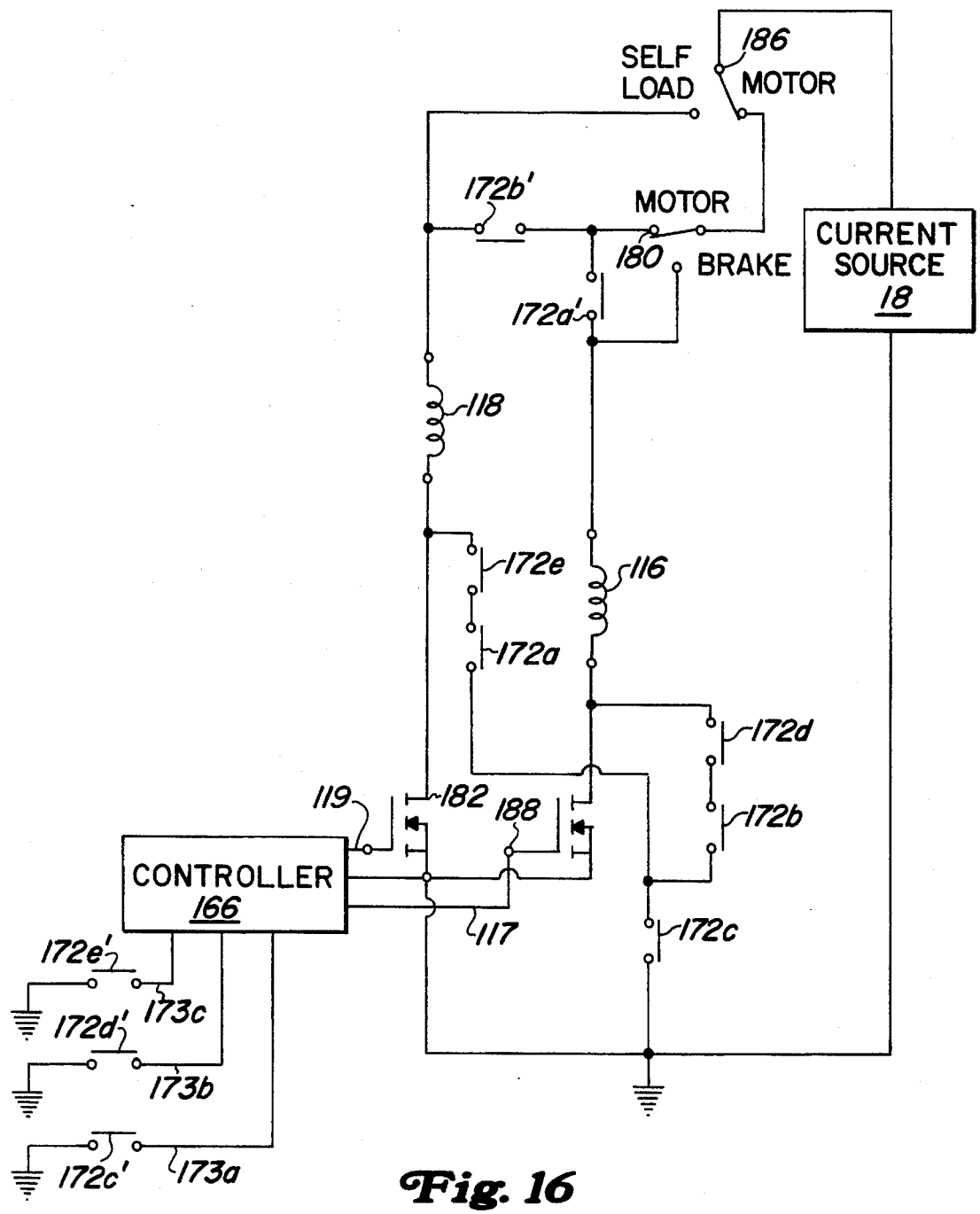
FIG. 16 is an electrical schematic depicting a coil actuation circuit in accordance with the present invention.

Referring to FIG. 16, the controller 166 receives contact position input signals 173a–c from the microswitches 172c'–e' to determine the position of the common shaft 122, and therefore, the positions of the moveable ends 146a and 146b of switch assemblies 178a–d. Also, microswitches 172a–e, selectively apply and interrupt current to the braking and self-load solenoids 116 and 118 during motoring of the locomotive. The operation of the microswitches 172a–e and 172c'–172e' facilitates automatic grid isolation.

In addition, the switch assemblies, respectively designated 178a–d, are different from the assemblies 132a–d (FIG. 6B) found on the prior art braking switch 100. Referring now to FIG. 14, a representative switch assembly is generally depicted at 178a. The switch assembly 178a prevents the movable end 146b from establishing electrical contact with the center contact 152' The right side of the center contact 152' is machined flat and coated with an insulating material.

Figure 15:
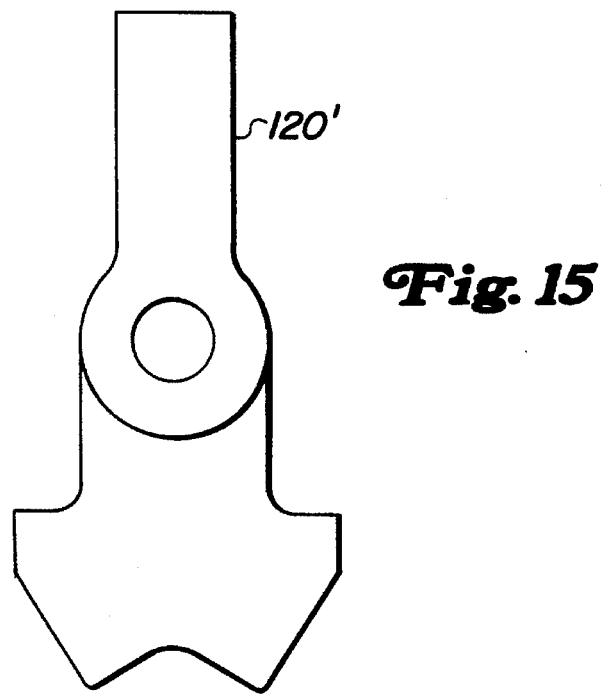
FIG. 15 is a mechanical drawing of a star wheel in accordance with the present invention

Finally, the star wheel 120' detent is reshaped to provide stronger detent action in the center position. FIG. 15 depicts the star wheel 120' in isolation.

Referring now to FIGS. 12A, 12B, and 16, the BMS 168 functions as follows. Assuming that the operator has the locomotive in dynamic braking mode, the BMS 168 is in the braking position. Via software control, switch 180 switches to "brake" position and the braking position cam 174e closes microswitch 172e', confirming to the controller 166, via input signal 173c, that the BMS 168 is indeed in the braking position. In addition, microswitches 172a, 172b', 172c and 172d are closed.

To engage motoring, the system sets controller switch 180 to "motor," and the controller 166 de-energizes braking solenoid 116, and applies control signal 119 to a self-load transistor 182, which allows current to flow though self-load solenoid 118. The energized self-load solenoid 118 then admits compressed air from the air conduit 110 into the air chamber 108, forcing the toothed rack 104 to the right, thereby causing star wheel 120' to rotate counter-clockwise. The claw assembly 124 responds to the movement of the star wheel 120', and causes the common shaft 122 to rotate clockwise. Once the common shaft 122 has rotated several degrees from the braking position, the braking position cam 174e opens microswitch 172e', indicating through input signal 173c that the switch is no longer in braking position. Also, just prior to the common shaft 122 reaching the center of its travel, the self-load to motor cam 174b rotates clear of microswitch 172b', releasing it, thereby interrupting current to and de-energizing the self-load solenoid 118. Hence, the microswitches manually override control of the solenoids to insure a quick shut off of the self-load solenoid.

At the center of the rotation of common shaft 122, cam 174c opens microswitch 172c and closes microswitch 172c' Upon the closing of microswitch 172c', position signal 173a indicates to the controller 166 that the BMS 168 is in the motoring position, and the controller 166 deactivates stimulus signal 119. Thus, at the center isolation state, microswitches 172a, b, c', d, and e are closed. Hence, the BMS 168 provides grid isolation during motoring. Motor position cam 174c depresses microswitch 172c', confirming to the controller 166 through signal 173a that the switch is indeed in the motoring position. If the common shaft 122 inadvertently rotates past the center of its travel, cam 174e causes microswitch 172c to close, temporarily energizing the braking solenoid 116, which forces the common shaft 122 to rotate back towards center. Thus, the microswitches 172a–e automatically operate to ensure that the BMS 168 enters the isolation state during motoring. If the controller actually turns on the transistors 182 and 188, then the switches 172a–e cannot override the controller. The switches 172a–e will, however, force the BMS to center position if the transistors are off and the BMS is not in full self load or braking position.

The roller 130 completes the motion, by applying a mechanical centering force to the star wheel 120' until the star wheel 120' comes to rest in the center position. Once at rest in the center position, cams 174a–c cause microswitches 172a', 172b', and 172c to open, preventing further operation of the braking and self-load solenoids 116 and 118.

To set the BMS 168 to self-load position, the operator sets controller switch 186 to "self-load," bypassing microswitches 172a–e, and allowing the controller 166 to apply the control signal 119 to the self-load transistor 182, which allows current to flow though to the self-load solenoid 118, which admits compressed air from the air conduit 110 into the air chamber 108, forcing the toothed rack 104 to the right, thereby causing star wheel 120' to rotate counter-clockwise. The claw assembly 124 responds to the movement of the star wheel 120', and causes the common shaft 122 to rotate clockwise. The switch assemblies 132a–d reconfigure their connections in response to the rotating common shaft 122. When the star wheel 120' reaches the self-load detent, the common shaft 122 couples moveable end 146a to center contact 152' and couples movable end 146b to self-load contact 154. The cam block 170, rotating with the common shaft 122, causes cams 174a, c and d to close, in order of rotation, and close microswitches 172c, 172a' and 172d'. Closing microswitch 172d' confirms to the controller 166, via position signal 173b, that the BMS 168 is indeed in the self-load position.

When returning to motoring, the operator sets controller switch 186 to "motor," and the controller 166 de-energizes self-load solenoid 118 and applies an energizing stimulus signal 117 to the braking transistor 188, which allows current to flow though to the braking solenoid 116. The energized braking solenoid 116 then admits compressed air from the air conduit 110 into the air chamber 106, forcing the toothed rack 104 to the left, thereby causing star wheel 120' to rotate clockwise. The claw assembly 124 responds to the movement of the star wheel 120', and causes the common shaft 122 to rotate counter-clockwise. Once the common shaft 122 rotates several degrees from the self-load position, the self-load position cam 174d opens microswitch 172d40, indicating through input signal 173b that the switch is no longer in self-load position. Also, just prior to the common shaft 122 reaching the center of its travel, the self-load to motor timing cam 174a rotates clear of microswitch 172a', releasing it, thereby interrupting current to and de-energizing the braking solenoid 116. At the center of rotation of the common shaft 122, cam 174e opens microswitch 172c and closes microswitch 172c'. Upon the closing of microswitch 172c', position signal 173a indicates to the controller 166 that the BMS 168 is in the isolation state for motoring, and the controller 166 deactivates the stimulus signal 117. As noted above, in the center position, microswitches 172a, b, c, d, and e are closed. If the common shaft 122 rotates (overshoots) past the center of its travel, cam 174c causes microswitch 172c to close, which then temporarily energizes the self-load solenoid 118 which forces the common shaft 122 to rotate back towards center. Thus, microswitches 172a–e automatically operate to ensure that the BMS 168 engages in the motoring position.

The roller 130 completes the motion, by applying a mechanical centering force to the star wheel 120' until the star wheel 120' comes to rest in the center position. Once at rest in the center position, cams 174a . c cause microswitches 172a', 172b', and 172c to open, preventing further operation of the braking and self-load solenoids 116 and 118.

The aforementioned isolation switch, therefore, allows the controller 166 to automatically and electronically control the BMS 168 to facilitate grid isolation during motoring. The BMS 168 has an electronically controllable centered, non conducting isolation state. Furthermore, the controller 166 can move the BMS 168 to the center position with the same control signals (self-load and brake) as in conventional locomotives. An extensive redesign and rewiring of the locomotive is thereby avoided.

In an alternative embodiment, the controller 166 sequences the operation of the braking solenoid 116 and self-load solenoid 118 differently to achieve greater reliability. When rotating the BMS 168 back to motor from self-load, for example, instead of de-energizing the self-load solenoid 118 prior to energizing the braking solenoid 116, the controller temporarily energizes both solenoids 116 and 118, simultaneously. This slows the travel of the star wheel 120', and makes mechanical seating of the roller 130 in the star wheel 120' detent more likely.

In another alternative embodiment where the controller can operate quickly enough to prevent overshoot, only microswitches 172c'–e' are used to provide position signals to the controller 166. Unlike the preferred embodiment, the microswitches 172a–e are not necessary to interrupt current to the braking and self-load solenoids, 116 and 118, directly. The controller 166 can exert total control over the centering operation via control signals 117 and 119.

Specific embodiments of a novel braking grid isolation system for locomotive traction motors have been described for the purposes of illustrating the manner in which the invention may be used and made. It should be understood that the implementation of other variations and modifications of the invention, in its various aspects, will be apparent to those of ordinary skill in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A locomotive traction motor control system comprising:
   a) a traction motor for converting electrical energy into kinetic energy when a locomotive motors and for converting kinetic energy into electrical energy when the locomotive engages dynamic braking;
   b) a resistive element for dissipating the electrical energy; and
   c) control means, operatively coupled to the resistive element, for selectively isolating the resistive element from the traction motor when the locomotive motors, said control means including:
      i) a first isolation switch, coupled in series with a first terminal on the traction motor and a first terminal on the resistive element, to selectively isolate the resistive element from the traction motor:
      ii) a second isolation switch couple din series with a second terminal on the traction motor and a second terminal on the resistive element, to selectively isolate the resistive element from the traction motor: and
      iii) a controller which opens the first and second isolation switches when the locomotive motors and closes the first and second isolation switches when the locomotive engages dynamic braking.

2. The system of claim 1 wherein the first and second isolation switch each include:
   a braking state where a first contact is coupled to a second contact, thereby coupling the resistive grid to the traction motor;
   a self-load state, where the first contact is coupled to a third contact, thereby coupling the resistive grid to the traction motor, and;
   a motoring state, where the first contact is isolated from the second and third contacts, thereby isolating the resistive grid from the traction motor.

3. A locomotive traction motor control system comprising:
   a) first and second traction motors, for converting electrical energy into kinetic energy when motoring a locomotive and for converting kinetic energy into electrical energy during dynamic braking;
   b) a resistive element, for dissipating the electrical energy; and
   c) control means, operatively coupled to the resistive element, for selectively isolating the resistive element from the traction motors during motoring, and for selectively connecting the resistive element in series with the traction motors during dynamic braking, the control means including:
      i) a first isolation switch, coupled in series with the first traction motor and a first terminal or the resistive element, to selectively isolate the resistive element from the first traction motor;
      ii) a second isolation switch, coupled in series with the second traction motor and a second terminal on the resistive element, to selectively isolate the resistive element from the second traction motor; and iii) control means for generating a control signal to facilitate control of the first and second isolation switches during motoring or for closing the first and second isolation switches during dynamic braking.

4. The traction motor control system of claim 3, wherein the first and second isolation switches are responsive to the control signal from the controller to facilitate moving a contact of the first and second switch to an isolated position.

5. The traction motor control system of claim 3, wherein the isolation switches are common to a single pneumatically actuated switch, which operates both switches in response to common control signals from the controller.

6. The traction motor control system of claim 3, further comprising:
   a) a first self-load switch, coupled between the current source and the first armature terminal of the first traction motor;
   b) a second self-load switch, coupled between the current source and the first armature terminal of the second traction motor; and
   c) third and fourth self-load switches, coupled in parallel with each other between the current source and a common point between the first and second resistive elements; wherein the control means closes the first and second self-load switches and opens the third and fourth self-load switches during motoring and dynamic braking, and opens the first and second self-load switches and closes the third and fourth self-load switches during self-load, such that during self-load, current produced by the current source is diverted from the traction motors and dissipated through the resistive grid.

7. A switch apparatus for a traction motor control system, comprising:
   a) at least one multi-state switch assembly, having:
      i) a first state where a first contact is coupled to a second contact;
      ii) a second state, where the first contact is coupled to a third contact; and
      iii) a third isolation state, where the first contact is isolated form the second and third contacts:
   b) actuator means responsive to electronic control signals, for selectively moving the first contact to said third isolation state;
   c) feedback means, responsive to movement of the first contact, for generating a position signal corresponding to the third isolation state of the first contact, said feedback means including:
      i) a cam block which accurately rotates in response to the actuator means, and includes a plurality of parallel cams, each having a cam profile;
      ii) a plurality of microswitches, in operative communication with the cams, to generate position signals corresponding to the position of the first contact in each of at least the first, second, and third state.

8. The switch apparatus of claim 7, wherein the cam block includes:
   a) a first position cam, to indicate when the first contact is in the first state;
   b) a second position cam, to indicate when the first contact is in the second state; and
   c) a third position cam, to indicate when the first contact is in the third isolation state.

9. The switch apparatus of claim 7, wherein the actuator means includes:
   a) a solenoid;
   b) an air valve, responsive to the solenoid;
   c) an air chamber, coupled to a first port on the air valve;
   d) a supply of compressed air, coupled to a second port on the air valve; and
   e) linkage means, responsive to the air chamber, for moving the first contact and for moving the feedback means when the solenoid admits compressed air into the air chamber.

10. A switch apparatus comprising:
   a) a plurality of three state switch assemblies, each assembly having:
      i) a first state where a first contact is coupled to a second contact;
      ii) a second state, where the first contact is coupled to a third contact, and;
      iii) a third isolation state, where the first contact is isolated from the second and third contacts;
   b) a cam block, which arcuately rotates synchronously with the first contact, and includes
      i) a first position cam, with a cam profile to indicate when the first contact is in the first state;
      ii) a second position cam, with a cam profile to indicate when the first contact is in the second state; and
      iii) a third position cam, with a cam profile to indicate when the first contact is in the third isolation state;
   c) at least three switches, one each in operative communication with one of the cams to provide switch position signals indicating whether the switch is in one of the three states;
   d) an actuator assembly, having:
      i) a first solenoid;
      ii) a first air valve, responsive to the first solenoid;
      iii) a first air chamber, coupled to a first port on the first air valve;
      iv) a second solenoid;
      v) a second air valve, responsive to the second solenoid;
      vi) a second air chamber, coupled to a first port on the second air valve;
      vii) a supply of compressed air, coupled to a second port on the first air valve, and coupled to a second port on the second air valve;
      viii) linkage means, responsive to the air chambers, for moving the first contact and for moving the cam block when the solenoid admits compressed air into the air chamber;
   e) control means, for applying a first control signal to the first solenoid to move the first contact to the first state, for applying a second control signal to the second solenoid to move the first contact to the second state, and for selectively applying either or both of the first and second control signals to the first and second solenoids, respectively, in response to at least one of the switch position signals, to move the first contact to the third isolation state.

* * * * *